(12) United States Patent
Caffrey et al.

(10) Patent No.: US 8,315,718 B2
(45) Date of Patent: Nov. 20, 2012

(54) CONTROL SYSTEMS AND METHODS OF PROVIDING THE SAME

(75) Inventors: Paul Oliver Caffrey, Roanoke, VA (US); John Alexander Petzen, III, Roanoke, VA (US); Dennis Brian King, Roanoke, VA (US); Frank L. Kerr, III, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 259 days.

(21) Appl. No.: 12/572,361

(22) Filed: Oct. 2, 2009

(65) Prior Publication Data

US 2011/0082570 A1 Apr. 7, 2011

(51) Int. Cl.
G05B 9/02 (2006.01)
G06F 13/42 (2006.01)
G06F 13/14 (2006.01)

(52) U.S. Cl. .......................... 700/79; 710/105; 710/305

(58) Field of Classification Search ................... 700/79; 710/105, 305
See application file for complete search history.

(56) References Cited

U.S. PATENT DOCUMENTS

| | | | | |
|---|---|---|---|---|
| 6,047,222 A * | 4/2000 | Burns et al. | | 700/79 |
| 6,965,806 B2 | 11/2005 | Eryurek et al. | | |
| 7,051,143 B2 * | 5/2006 | White et al. | | 710/305 |
| 7,206,646 B2 | 4/2007 | Nixon et al. | | |
| 7,472,417 B2 | 12/2008 | Gerlach et al. | | |
| 7,519,012 B2 | 4/2009 | Tapperson et al. | | |
| 7,552,367 B2 * | 6/2009 | Kasztenny et al. | | 714/703 |
| 2003/0023795 A1 * | 1/2003 | Packwood et al. | | 710/105 |
| 2005/0228509 A1 * | 10/2005 | James | | 700/19 |
| 2007/0076882 A1 * | 4/2007 | Engel et al. | | 380/255 |
| 2007/0280178 A1 * | 12/2007 | Hodson et al. | | 370/338 |
| 2011/0264240 A1 * | 10/2011 | Pettigrew et al. | | 700/7 |

FOREIGN PATENT DOCUMENTS

EP 1814004 A1 8/2007

OTHER PUBLICATIONS

N-TRON The Industrial Network Company; Why Use Industrial Ethernet Switches?; 3 pages; printed from Internet on Mar. 2, 2012.*
European Search Report issued in connection with EP Patent Application No. 10182702.0, Dec. 1, 2011.

* cited by examiner

Primary Examiner — Ronald Hartman, Jr.
(74) Attorney, Agent, or Firm — Sutherland Asbill & Brennan LLP

(57) ABSTRACT

Control systems and methods for controlling certain systems, devices, and apparatus are described. A control system may include a memory and at least one processor. The memory may be operable to store both a Foundation Fieldbus protocol that facilitates communication with one or more Foundation Fieldbus devices and a second protocol that facilitates communication with one or more control devices. The at least one processor may be operable to access both the Foundation Fieldbus protocol and the second protocol, and to control the one or more Foundation Fieldbus devices and the one or more control devices. A network may facilitate communications between the at least one processor and both the one or more Foundation Fieldbus devices using the Foundation Fieldbus protocol and the one or more control devices using the second protocol.

18 Claims, 2 Drawing Sheets

CONTROL SYSTEMS AND METHODS OF PROVIDING THE SAME

FIELD OF THE INVENTION

Embodiments of the invention relate generally to control systems and more specifically to control systems that utilize both a Foundation Fieldbus protocol and a second protocol for communications.

BACKGROUND OF THE INVENTION

Control systems are utilized in a wide variety of different applications. For example, control systems are utilized in conjunction with power generating devices, in power plants, and/or in process plants. A control system typically includes a central controller in communication with other components of the control system, for example, sensors, measurement devices, valves, etc. The central controller typically communicates with the other components via suitable network communications.

With the development and adoption of the Foundation Fieldbus standard, Foundation Fieldbus devices have been incorporated into control systems. Communications may be facilitated between the Foundation Fieldbus devices and between the Foundation Fieldbus devices and a central controller via network communications formatted in accordance with a Foundation Fieldbus protocol. However, the Foundation Fieldbus protocol may be different than a protocol that facilitates communications between the central controller and non-Foundation Fieldbus devices or components. The existence of devices that utilize different protocols often leads to interconnectivity problems within the control system. Additionally, the use of different protocols may often necessitate the use of additional devices and/or network infrastructure, thereby increasing the overall cost of the control system.

Accordingly, a need exists for control systems that utilize both a Foundation Fieldbus protocol and a second protocol for communications.

BRIEF DESCRIPTION OF THE INVENTION

Some or all of the above needs and/or problems may be addressed by certain embodiments of the invention. Embodiments of the invention may include control systems and methods of providing the same. According to one embodiment of the invention, there is disclosed a control system. The control system may include a memory and at least one processor. The memory may be operable to store both a Foundation Fieldbus protocol that facilitates communication with one or more Foundation Fieldbus devices and a second protocol that facilitates communication with one or more control devices. The at least one processor may be operable to access both the Foundation Fieldbus protocol and the second protocol, and to control the one or more Foundation Fieldbus devices and the one or more control devices. A network may facilitate communications between the at least one processor and both the one or more Foundation Fieldbus devices using the Foundation Fieldbus protocol and the one or more control devices using the second protocol.

According to another embodiment of the invention, there is disclosed a method for providing a control system. At least one processor may be provided. Within a single memory accessible by the at least one processor, a Foundation Fieldbus protocol that facilitates communication with Foundation Fieldbus devices and a second protocol that facilitates communication with other devices may be co-located. One or more Foundation Fieldbus devices and one or more other devices that are in communication with the at least one processor via a network may be provided. The at least one processor may be operable to communicate with the one or more Foundation Fieldbus devices using the Foundation Fieldbus protocol and the one or more other devices using the second protocol.

According to yet another embodiment of the invention, there is disclosed a control system. The control system may include a controller, one or more Foundation Fieldbus devices, one or more other devices, and a memory. The controller may include one or more processors and operable to control the operations of other components of the control system. The one or more Foundation Fieldbus devices may be operable to communicate with the controller via a network using a Foundation Fieldbus protocol. The one or more other devices may be operable to communicate with the controller via the network using a second protocol. The memory may be accessible by the controller and operable to store both the Foundation Fieldbus protocol and the second protocol.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Figure 1:
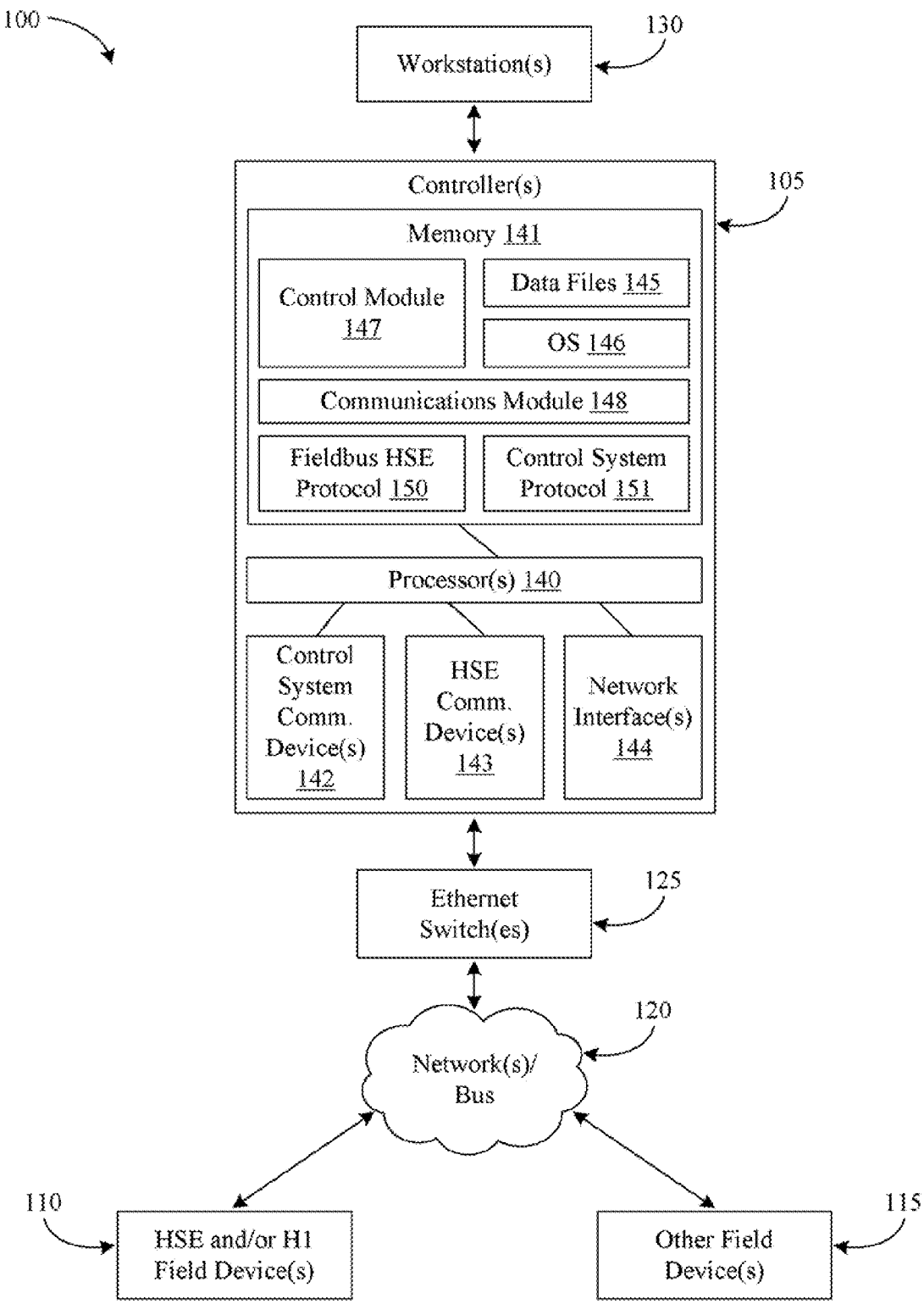

Having thus described the invention in general terms, reference will now be made to the accompanying drawings, which are not necessarily drawn to scale, and wherein:

FIG. 1 is a schematic diagram of one example control system that may be utilized in accordance with various embodiments of the invention.

Figure 2:
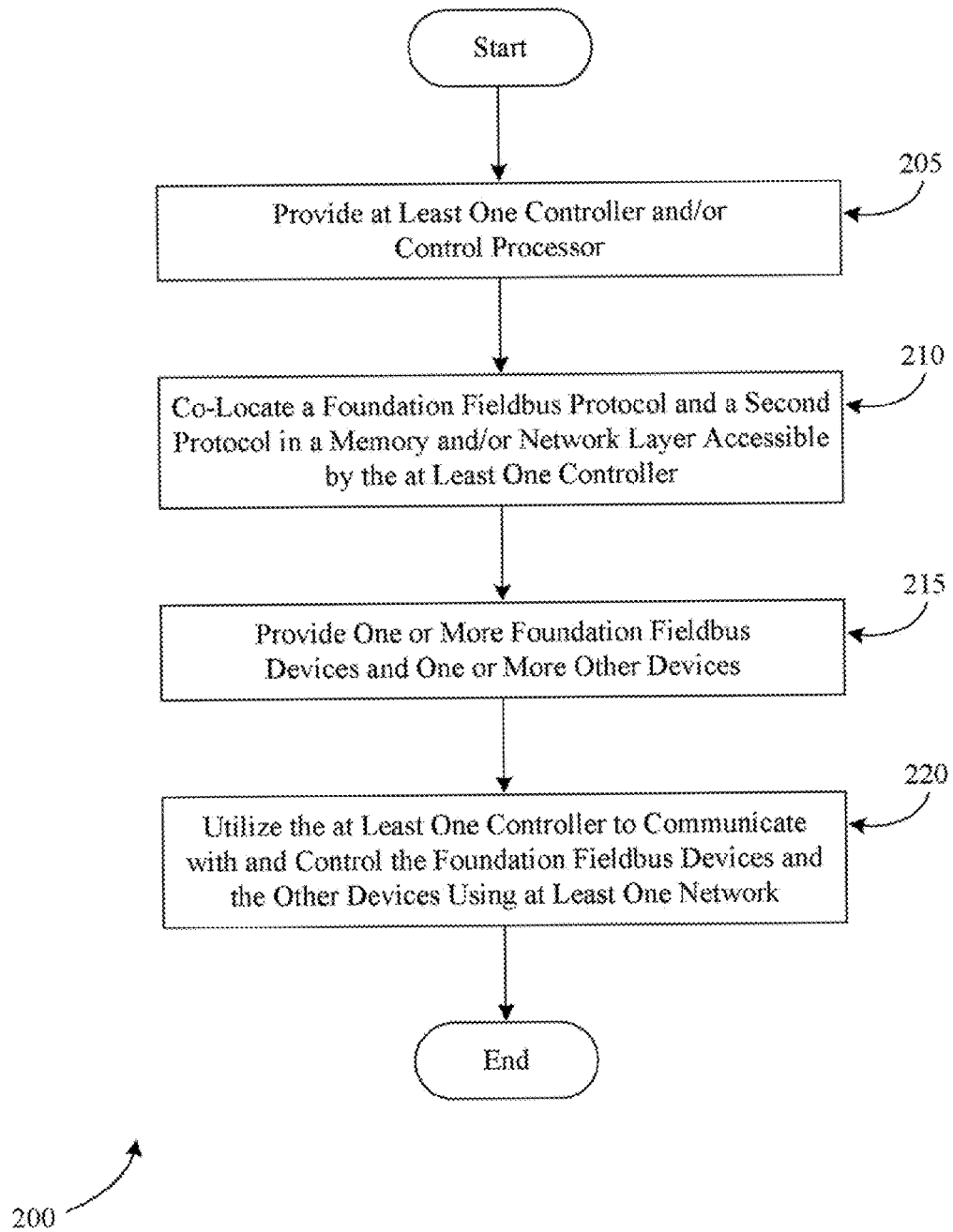

FIG. 2 is a flow chart of one example method for providing a control system, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For purposes of this disclosure, the term "network layer" may refer to both the hardware components of a network and the software associated with the network. A network layer may include for example, a network infrastructure, wiring, optical fiber, network cards, routers, etc. Additionally, a network layer may include network protocols and/or other software components that facilitate communications over a network.

Disclosed are control systems and methods for controlling certain types of systems, devices, and apparatus. The control systems may co-locate both a Foundation Fieldbus protocol and a second protocol within the same memory device and/or within the same network layer. The two network protocols may be accessed and utilized by one or more processor and/or central controllers associated with the control systems in order to facilitate network communications within the control system. As desired, the central controller and/or processors may synchronize communications utilizing the Foundation Fieldbus protocol and communications utilizing the second protocol. In this regard, relatively seamless integration may be provided for Foundation Fieldbus devices within the control system. Additionally, as desired in various embodiments of the invention, a single network infrastructure may be utilized for communications with the Foundation Fieldbus devices and other devices that utilize the second protocol. Furthermore, the use of gateway devices that facilitate communications between the central controllers and the Foundation Fieldbus devices may be avoided.

Various embodiments of the invention may include one or more special purpose computers, systems, and/or particular machines that facilitate the access of data from a database. A special purpose computer or particular machine may include a wide variety of different software modules as desired in various embodiments. As explained in greater detail below, in certain embodiments, these various software components may be utilized to collect user information associated with a database object and to dynamically generate database queries based upon the received user input.

Certain embodiments of the invention described herein may have the technical effect of facilitating relatively seamless integration of Foundation Fieldbus devices into control systems. Additionally, certain embodiments of the invention may have the technical effect of reducing the overall infrastructure requirements and cost of a control system network.

Various embodiments of the invention incorporate Foundation Fieldbus-type (hereinafter "Fieldbus") devices into control systems, for example, control systems associated with power generating devices (e.g., gas turbines, steam turbines, wind turbines, etc.), power plants, and/or process plants. A wide variety of Fieldbus devices may be utilized as desired in various embodiments of the invention. Examples of Fieldbus devices include but are not limited to sensors, gauges, measurement devices, valves, actuators, input/output subsystems, host systems, linking devices, any suitable Fieldbus H1 devices, and/or any suitable Fieldbus high-speed Ethernet (HSE) devices. In certain embodiments, H1 devices may operate and/or communicate at a different rate than HSE devices. As one example, H1 devices may operate at approximately 31.25 kilobits per second, and HSE devices may operate at approximately 100 megabits per second. As desired, various HSE devices, such as linking devices, may be utilized to interconnect H1 devices to a central controller of the control system. Additionally, the term HSE protocol may be utilized to refer to a Fieldbus protocol that facilitates communications with HSE Fieldbus devices.

Communications between Fieldbus devices and/or between one or more central controllers and/or processors of the control system and the Fieldbus devices may be facilitated by utilizing a Fieldbus protocol. The Fieldbus protocol is an all-digital serial, two-way communication protocol that provides a standardized physical interface to a bus or network interconnecting field equipment or Fieldbus devices. The Fieldbus protocol is an open-architecture protocol developed and administered by the Fieldbus Foundation. The Fieldbus protocol provides, in effect, a local area network for field instruments or field devices within a plant or facility, which enables these field devices to perform control functions at locations distributed throughout the facility and to communicate with one another before and after the performance of these control functions to implement an overall control strategy. Because the Fieldbus protocol enables control functions to be distributed throughout a process control network, it may reduce the workload of a central controller.

FIG. 1 is a block diagram of one example control system 100 that may be utilized in accordance with various embodiments of the invention. The control system 100 may include one or more central controllers 105 and/or central control devices, one or more Fieldbus devices 110 (e.g., HSE and/or H1 Fieldbus devices), and/or one or more other devices 115 (i.e. non-Fieldbus devices). The central controller 105 may communicate with one or more of the Fieldbus devices 110 and with one or more of the other devices 115 via one or more suitable networks 120 or communications buses. As desired in certain embodiments, one or more switches, such as one or more Ethernet switches 125, may be utilized to facilitate communications over the networks 120.

In certain embodiments of the invention, one or more workstations 130 may be provided. The workstations 130 may facilitate the receipt of user input and/or user commands associated with the operation of the control system 100. In other words, the workstations 130 may facilitate user interaction with the central controller 105. The workstations 130 may include one or more suitable computers or computing devices, such as personal computers, hand-held computing devices, mini-computers, etc. Additionally, the workstations 130 may be in communication with the central controller 105 via one or more suitable network connections, for example, a direct link or direct connection, a local area network, a wide area network, the Internet, a radio frequency (RF) network, a Bluetooth™ enabled network, any suitable wired network, or any suitable wireless network. In this regard, user commands, instructions, and/or other input associated with the operation of the control system 100 may be received by the workstations 130 and communicated to the central controller 105. Additionally, output data associated with the operations of the control system 100 and/or a plant or other system monitored by the control system 100 may be communicated to the workstations 130 by the central controller 105 for output and/or display to a user.

With continued reference to FIG. 1, any number of Fieldbus devices 110 may be utilized in association with the control system 100. One or more of the Fieldbus devices 110 may be in communication with the central controller 105 via the network 120. Additionally, in certain embodiments, two or more Fieldbus devices 110 may be in communication with one another via the network 120. A wide variety of different types of Fieldbus devices may be utilized as desired in various embodiments of the invention. In certain embodiments, the Fieldbus devices 110 may include HSE Fieldbus devices and/or H1 Fieldbus devices. As desired in certain embodiments, HSE Fieldbus devices, such as linking devices, may facilitate communications between the central controller 105 and one or more H1 Fieldbus devices.

According to an aspect of the invention, communications between Fieldbus devices 105 and communications between the central controller 105 and one or more of the Fieldbus devices 105 may be facilitated using the Fieldbus protocol.

With continued reference to FIG. 1, any number of non-Fieldbus devices or other devices 115 may be utilized in association with the control system 100. These other devices 115 may include, for example, sensors, gauges, measurements devices, actuators, valves, control subsystems, etc. One or more of these other devices 115 may be in communication with each other and/or with the central controller 105 via the network 120. Additionally, in accordance with an aspect of the invention, communications to and/or from the other devices 115 may be facilitated utilizing one or more network protocols other than the Fieldbus protocol. For example, a second protocol associated with the control system 100, such as an Ethernet Global Data (EGD) protocol or other suitable protocol, may be utilized to facilitate communications with the other devices 115. In this example, the other devices 110 may include devices that are configured to receive and/or send communications in accordance with the EGD protocol. Although the second protocol is described as an EGD protocol, any number of other protocols may be utilized as desired in various embodiments of the invention.

The one or more networks 120 and/or data buses may include any suitable network or combination of networks that facilitate communications between devices in the control system 100. Examples of suitable networks include, but are not limited to, a local area network, a wide area network, the Internet, a radio frequency (RF) network, a Bluetooth™ enabled network, any suitable wired network, any suitable wireless network, or any suitable combination of wired and wireless networks. In certain embodiments of the invention, a single network 120, may facilitate communications between the central controller 105 and both the Fieldbus devices 110 and the other devices 115. As a result of utilizing a single network for communications with the Fieldbus devices 110 and the other devices 115, the hardwire requirements (e.g., wiring, cable, optics, switches, etc.) and their associated cost may be reduced.

In certain embodiments of the invention, such as embodiments that utilize an Ethernet network, one or more Ethernet switches 125 may be provided. The Ethernet switches 125 may route data within the network 120. Each of the Ethernet switches 125 may include hardware and/or software components that are operable to facilitate the routing of data within the network 120. Examples of suitable Ethernet switches 125 include, but are not limited to, network bridges, multilayer switches, etc.

As desired in various embodiments of the invention, redundant components may be provided within the network 120. For example, redundant wiring, switches, and/or routers may be provided. Additionally, in certain embodiments redundant Fieldbus devices and/or redundant non-Fieldbus or other devices may be provided. In this regard, adequate operations may be maintained within the control system 100 in the event of failure of network devices and/or field devices.

With continued reference to FIG. 1, the control system 100 may include a central controller 105. Some examples of suitable central controllers are a Mark™ VI control system and a Mark™ Vie control system produced by the General Electric Company. The central controller 105 may be operable to communicate with and/or control other components of the control system 100 and/or components of the plant or system that is controlled by the control system 100. The central controller 105 may be further operable to generate communications in accordance with any number of suitable protocols. For example, the central controller 105 may be operable to generate communications in accordance with the Fieldbus protocol and in accordance with a second protocol, such as the EGD protocol. In this regard the central controller 105 may communicate with both the Fieldbus devices 110 and the other devices 115.

The central controller 105 may be a processor driven device that controls the operations of the control system 100. For example, the central controller 105 may include any number of special purpose computers or particular machines, application specific circuits, programmable logic controllers (PLC), microcontrollers, personal computers, minicomputers, mainframe computers, supercomputers, and the like. In certain embodiments, the operations of the central controller 105 may be controlled by computer-executed or computer-implemented instructions that are executed by one or more processors associated with the central controller 105. The instructions may be embodied in one or more software components as desired in various embodiments of the invention. The execution of the instructions may form a special purpose computer or other particular machine that is operable to control the operations of the control system 100 and/or facilitate communications with other components of the control system 100. The one or more processors that control the operations of the central controller 105 may be incorporated into the central controller 105 and/or in communication with the central controller 105 via one or more suitable networks. In certain embodiments of the invention, the operations and/or control of the central controller 105 may be distributed amongst several processing components.

The central controller 105 may include one or more processors 140, one or more memory devices 141, one or more control system communication devices 142, one or more HSE or Fieldbus communication devices 143, and one or more network interface(s) 144. The one or more memory devices 141 may be any suitable memory devices, for example, caches, read only memory devices, random access memory devices, magnetic storage devices, etc. The one or more memory devices 141 may store data, executable instructions, and/or various program modules utilized by the central controller 105, for example, data 145 associated with the operation of the control system, an operating system 146, a control module 147, and a communications module 148. Additionally, the memory 141 may be operable to store both a Fieldbus or HSE protocol 150 and a second protocol, illustrated in FIG. 1 as a control system protocol 151 (e.g., an EGD protocol). The data 125 may include any suitable data associated with the operation of the control system 100 and/or the operation of the plant or system monitored by the control system 100, for example, measurements data, operating data, etc. The operating system (OS) 146 may include executable instructions and/or program modules that facilitate and/or control the general operation of the central controller 105. For example, the OS 146 may facilitate the execution of other software programs and/or program modules by the processors 140.

The control module 147 may be operable to monitor and/or control the overall operations of the control system 100 and/or the plant or system that is monitored and/or controlled by the control system 100. In doing so, the control module 147 may utilize various measurements and/or other data associated with the operation of the control system 100 and/or the monitored plant or system. At least a portion of the utilized data may be received from the Fieldbus devices 110 and/or the control system devices 115. The control module 147 may be further operable to generate command signals associated with the operation of the control system 100 and to direct the communication of the generated signals to other components of the control system 100, for example, to the Fieldbus devices 110 and/or the control system devices 115.

The communications module 148 may be operable to format and/or generate communications to be transmitted over the network 120. Additionally, the communications module 148 may be operable to receive communications that have been transmitted to the central controller 105 and to extract data from the received communications. The communications module 148 may utilize both the Fieldbus or HSE protocol 150 and/or one or more other protocols, such as the control system or second protocol 151, during the formatting of communications.

In certain embodiments, the communications module 148 may include run-time software that incorporates two Ethernet stacks executing on the same Ethernet layer. A first Ethernet stack may include communications formatted in accordance with the Fieldbus protocol 150 and the second Ethernet stack may include communications formatted in accordance with the second protocol 151 (e.g., an EGD protocol). The two Ethernet stacks may be executed in parallel, facilitating communications between the central controller 105 and both the Fieldbus devices 110 and the other devices 115. As a result, relatively seamless integration of the Fieldbus devices 110 with the central controller 105 and the remainder of the control system 100 may be provided in this regard, active participation of the Fieldbus devices 110 in the control scheme may be facilitated.

Because traditional I/O communications and Fieldbus I/O communications are integrated within the same central controller 105, the use of one or more gateway or portal devices to facilitate communications between the central controller 105 and the Fieldbus devices 110 may be avoided. As a result, a relatively lower network latency may be achieved and translation errors may be reduced or avoided. Additionally, the same infrastructure, rather than a parallel infrastructure, may be utilized to facilitate communications with both the Fieldbus devices 110 and the other devices 115. As a result, a scalable system may be provided that may incorporate any number of protocols within the central controller 105.

Additionally, the communications module 148 may be operable to synchronize communications using the Fieldbus protocol 150 and communications using the control system protocol 151. As an example, the other devices 115 may operate at a higher clock frequency than the Fieldbus devices 110. As a result, commands and/or other communications that are communicated to the Fieldbus devices 110 may be synchronized with commands and/or other communications that are communicated to the other devices 115. In this regard, the HSE protocol 151 may be synchronized with a relatively faster protocol, such as the EGD protocol.

According to an aspect of the invention, both a Fieldbus protocol 150 and a second protocol 151 may be co-located within a single memory device that is accessible by the processors 140. By co-locating the two protocols within a single memory device, a relatively seamless integration of Fieldbus devices 110 into the control system 100 may be provided without utilizing a gateway or other hardware to facilitate communications with the Fieldbus devices 110. For example, Fieldbus devices 110 may be integrated into an existing control system. Additionally, a single network layer may be utilized as desired to facilitate communications with both the Fieldbus devices 110 and the other devices 115.

With continued reference to FIG. 1, the control system communication devices 142, the HSE or Fieldbus communication devices 143, and/or the network interfaces 144 may facilitate connection of the central controller 105 to the network 120 and/or to the workstations 130. The control system communication devices 142 may include input/output cards (e.g., Ethernet cards) and/or devices that facilitate communications using the second protocol and/or other non-Fieldbus protocols. Similarly, the Fieldbus communication devices 143 may include input/output cards and/or other devices that facilitate communications using the Fieldbus protocol and the network interfaces 144 may include input/output cards and/or other devices that facilitate communications with the workstations 130. In this regard, the central controller 105 may communicate with other components of the control system 100. Although separate cards and/or network devices are illustrated in FIG. 1, in certain embodiments, a single network card or other device, such as a single Ethernet card, may facilitate communications with both Fieldbus devices 110 and/or other devices 115.

As desired, embodiments of the invention may include a control system 100 with more or less than the components illustrated in FIG. 1. The control system 100 of FIG. 1 is provided by way of example only.

FIG. 2 is a flowchart illustrating one example method 200 for providing a control system, according to an illustrative embodiment of the invention. The provided control system may be similar to the control system 100 illustrated in FIG. 1.

The method 200 may begin at block 205. At block 205, at least one controller and/or control processor for the control system 100 may be provided. The controller may be similar to the central controller 105 illustrated in FIG. 1 and described above. At block 210, both a Fieldbus protocol and a second protocol may be co-located within a memory and/or network layer that is accessible by the central controller 105.

At block 215, one or more Fieldbus devices, such as the Fieldbus devices 110 illustrated in FIG. 1, and one or more other devices, such as the other devices 115 illustrated in FIG. 1, may be provided. The one or more Fieldbus devices 110 may be operable to communicate with each other and/or the central controller 105 utilizing the Fieldbus protocol. Similarly, the one or more other devices 115 may be operable to communicate with each other and/or the central controller 105 utilizing the second protocol. A wide variety of second protocols may be utilized as desired in various embodiments of the invention, for example, an EGD protocol. Additionally, in certain embodiments, a plurality of non-Fieldbus protocols may be utilized.

At block 220, the central controller 105 may access the stored Fieldbus protocol and the stored second protocol, and the central controller 105 may utilize the two protocols to communicate with and/or control the Fieldbus devices 110 and the other devices 115. At least one network, such as the network 120 illustrated in FIG. 1, may be provided to facilitate communications between the central controller 105, the Fieldbus devices 110, and the other devices 115.

As a result, Fieldbus devices 110 may be integrated into a control system. As a result of co-locating the Fieldbus protocol and a second protocol within a single memory and/or network layer, a relatively seamless integration of the Fieldbus devices 110 into the control system may be provided.

The method 200 may end following block 220.

The operations described in the method 200 of FIG. 2 do not necessarily have to be performed in the order set forth in FIG. 2, but instead may be performed in any suitable order. Additionally, in certain embodiments of the invention, more or less than all of the elements or operations set forth in FIG. 2 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implements by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system comprising:
   a memory operable to store both a Foundation Fieldbus protocol that facilitates communication with one or more high-speed Ethernet (HSE) Foundation Fieldbus devices and an Ethernet Global Data (EGD) protocol that facilitates communication with one or more control devices; and
   at least one processor operable to access both the Foundation Fieldbus protocol and the EGD protocol, and to control the one or more HSE Foundation Fieldbus devices and the one or more control devices,
   wherein an Ethernet network facilitates communications between the at least one processor and both the one or more HSE Foundation Fieldbus devices using the Foundation Fieldbus protocol and the one or more control devices using the EGD protocol.

2. The control system of claim 1, wherein the one or more HSE Foundation Fieldbus devices comprise one or more linking devices, and
   wherein the at least one processor is operable to control one or more additional Foundation Fieldbus devices via the one or more linking devices.

3. The control system of claim 2, wherein the one or more additional Foundation Fieldbus devices comprise one or more of sensors, measurement devices, actuators, or valves.

4. The control system of claim 1, further comprising:
   one or more Ethernet switches operable to route data within the network.

5. The control system of claim 4, wherein at least one of the one or more HSE Foundation Fieldbus devices, the one or more control devices, or the one or more Ethernet switches comprise redundant devices.

6. The control system of claim 1, wherein the at least one processor is further operable to synchronize communications utilizing the Foundation Fieldbus protocol and communications utilizing the EGD protocol.

7. The control system of claim 1, wherein the at least one processor is further operable to control one of a turbine, a power generator, a power plant, or a process plant.

8. A method for providing a control system, the method comprising:
   providing at least one processor;
   co-locating, within a single memory accessible by the at least one processor, a Foundation Fieldbus protocol that facilitates communication with high-speed Ethernet (HSE) Foundation Fieldbus devices and an Ethernet Global Data (EGD) protocol that facilitates communication with other devices; and
   providing one or more HSE Foundation Fieldbus devices and one or more other devices that are in communication with the at least one processor via an Ethernet network,
   wherein the at least one processor is operable to communicate with the one or more HSE Foundation Fieldbus devices using the Foundation Fieldbus protocol and the one or more other devices using the EGD protocol.

9. The method of claim 8, wherein the one or more HSE Foundation Fieldbus devices comprise one or more linking devices, and
   wherein the at least one processor is operable to control one or more additional Foundation Fieldbus devices via the one or more linking devices.

10. The method of claim 9, wherein the one or more additional Foundation Fieldbus devices comprise one or more of sensors, measurements devices, actuators, or valves.

11. The method of claim 8, further comprising:
    providing one or more Ethernet switches operable to route data within the network.

12. The method of claim 11, wherein at least one of the one or more HSE Foundation Fieldbus devices, the one or more other devices, or the one or more Ethernet switches comprise redundant devices.

13. The method of claim 8, further comprising synchronizing communications utilizing the Foundation Fieldbus protocol and communications utilizing the EGD protocol.

14. The method of claim 8, further comprising controlling the operations of a turbine, a power generator, a power plant, or a process plant.

15. A control system, comprising:
    a controller comprising one or more processors and operable to control the operations of other components of the control system;

one or more Foundation Fieldbus devices operable to communicate with the controller via a network using a Foundation Fieldbus protocol;

one or more other devices operable to communicate with the controller via the network using an Ethernet Global Data (EGD) protocol; and a memory accessible by the controller and operable to store both the Foundation Fieldbus protocol and the EGD protocol.

16. The control system of claim 15, wherein the network comprises an Ethernet network.

17. The control system of claim 15, wherein the one or more Foundation Fieldbus devices comprise one or more high-speed Ethernet (HSE) Foundation Fieldbus devices.

18. The control system of claim 15, wherein the controller is further operable to synchronize communications utilizing the Foundation Fieldbus protocol and communications utilizing the EGD protocol.

* * * * *